United States Patent
Hattori

(10) Patent No.: US 6,510,016 B1
(45) Date of Patent: Jan. 21, 2003

(54) HEAD POSITIONING CONTROL SYSTEM FOR DISK DRIVE

(75) Inventor: Toshiro Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/572,303

(22) Filed: May 18, 2000

(30) Foreign Application Priority Data

May 19, 1999 (JP) .......................................... 11-137942

(51) Int. Cl.[7] ............................................. G11B 5/596
(52) U.S. Cl. .................. 360/77.02; 360/75; 360/77.04; 360/77.08; 369/44.28
(58) Field of Search .......................... 360/77.02, 77.04, 360/77.08, 75; 369/44.28, 44.29

(56) References Cited

U.S. PATENT DOCUMENTS

| | | | | |
|---|---|---|---|---|
| 4,536,809 A | * | 8/1985 | Sidman | 360/77.04 |
| 4,607,355 A | * | 8/1986 | Koide | 369/44.29 |
| 4,788,608 A | * | 11/1988 | Tsujisawa | 360/77.04 |
| 4,831,471 A | * | 5/1989 | Tsujisawa | 360/78.04 |
| 5,675,563 A | * | 10/1997 | Sasaki | 369/44.28 |
| 6,335,845 B1 | * | 1/2002 | Yamaguchi et al. | 360/75 |
| 6,366,423 B1 | * | 4/2002 | Ahn | 360/77.08 |
| 6,421,197 B1 | * | 7/2002 | Abdelnour | 360/77.02 |

FOREIGN PATENT DOCUMENTS

| | | |
|---|---|---|
| JP | 03-108126 | 5/1991 |
| JP | 05-242492 | 9/1993 |
| JP | 06-119650 | 4/1994 |
| JP | 08-329480 | 12/1996 |
| JP | 09-312026 | 12/1997 |
| JP | 2000-020963 | 1/2000 |

OTHER PUBLICATIONS

Alexei H. Sacks et al., "Advanced Method for Repeatable Runout Compensation", Mar. 1995, pp. 1031–1036.

* cited by examiner

Primary Examiner—David Hudspeth
Assistant Examiner—Fred F. Tzeng
(74) Attorney, Agent, or Firm—McGinn & Gibb, PLLC

(57) ABSTRACT

A positioning control system for a disk drive can reduce static friction of the sliding type actuator to be a cause of degradation of low order spindle rotation synchronization run-out. The positioning control system includes position error detecting means for detecting a position error between a center of a data track on a disk medium and a head for reading data from the disk medium, shifting means for shifting the head, a phase compensator for positioning the head at a target position on the basis of a result of detection of the position error detecting means, detecting means for detecting influence of a static frictional force for the shifting means based on an output of the phase compensator, a friction compensator outputting a feed forward signal for driving the shifting means, and means for applying the feed forward signal from the friction compensator to the shifting means from the friction compensator when influence of the static frictional force to the shifting means is detected by the detecting means.

7 Claims, 4 Drawing Sheets

HEAD POSITIONING CONTROL SYSTEM FOR DISK DRIVE

BACKGROUND OF THE INVENTION

1. Field of the Invention

The present invention relates generally to a head positioning control system for a disk drive. More particularly, the invention relates to a head positioning control method in a disk drive using a sliding type actuator.

2. Description of the Related Art

Conventionally, in a disk drive, a head is shifted to follow a track on a disk medium surface by means of a head positioning control system employing a phase compensator, such as a read lag filter or a PID (feedback) compensator and so forth.

Particularly, in case of a floppy disk drive, since it is required to fix a disk medium on a spindle, a primary rotation synchronization run-out due to chucking error and a secondary rotation synchronization run-out due to expansion and contraction of a film medium should particularly cause problems. However, in the conventional floppy disk drive, positioning at high precision is not required, and positioning employing a stepping motor is sufficient.

On the other hand, in case of a large capacity floppy disk drive in the recent years, positioning at precision in the order of several μm which is higher than that required for the conventional floppy disk drive, is required. Therefore, a method for obtaining a position error of the head from the disk medium surface with employing a VCM (Voice Coil Motor) as a motor.

A compression ratio relative to a low order spindle rotation synchronization frequency of run-out determined from a necessary head positioning precision is certainly obtained by taking a sufficient control band in a closed loop system employing a phase compensator.

On the other hand, in case of the hard disk drive, there has been proposed a method employing a frequency shaping filter improving a compression ratio characteristics of a frequency of rotation synchronization component as a loop characteristics by utilizing an internal principle as a rotation synchronous run-out filter in the hard disk drive and increasing a gain of a rotation synchronization component including a sine wave model within the closed loop. This method has been disclosed in "Advanced Methods for Repeatable Runout Compensation" (IEEE Transactions on Magnetics, Vol. 31, No. Mar. 2, 1995).

In the positioning method of the head in the conventional disk drive set forth above, in case of the large capacity floppy disk drive, if greater capacity is sought, it becomes difficult to certainly provide compression ratio of the low order spindle rotation synchronous frequency of the run-out due to narrowing of a traffic pitch. Particularly, when a sliding type actuator is used, influence to non-linear friction between the movable portion and a guide rod is becoming significant.

On the other hand, in case of the method employing the frequency shaping filter in the hard disk drive, a memory for storing position error information for one turn becomes necessary to be a cause of cost-up.

SUMMARY OF THE INVENTION

The present invention has been worked out in order to solve the problems set forth above. It is therefore an object of the present invention to provide a head position control system for a disk drive which can reduce influence of static friction of a sliding type actuator which otherwise serves for degradation of low order spindle rotation synchronization run-out.

In order to accomplish the above-mentioned and other objects, according to one aspect of the present invention, a positioning control system for a disk drive comprises:

position error detecting means for detecting a position error between a center of a data track on a disk medium and a head for reading data from the disk medium;

shifting means for shifting the head;

a phase compensator for positioning the head at a target position on the basis of a result of detection of the position error detecting means;

detecting means for detecting influence of a static frictional force for the shifting means based on an output of the phase compensator;

a friction compensator outputting a feed forward signal for driving the shifting means; and means for applying the feed forward signal from the friction compensator to the shifting means from the friction compensator when influence of the static frictional force to the shifting means is detected by the detecting means.

In the preferred construction, the shifting means may be a sliding type actuator. The friction compensator may detect influence of the static frictional force to the shifting means by monitoring at least one of a control signal for the shifting means output from the phase compensator or a driven current signal for driving the shifting means.

The feed forward signal may be a signal for generating a sufficient force for shifting the head against influence of static frictional force on the shifting means. The feed forward signal may be a peak value of one of the control signal and the drive current signal. The detecting means may detect influence of the static frictional force on the shifting means by monitoring result of detection of the position error detecting means.

Preferably, means for applying the feed forward signal to the shifting means may be a switch for switching between an output of the phase compensator and the feed forward signal from the friction compensator.

Namely, the positioning control system according to the present invention monitors drive signal for the actuator to make judgment that the static frictional force influences if the drive signal does not fall within the given range, for storing the peak value thereupon to generate the control signal generating the necessary force for shifting the movable portion. The stored peak value is then applied as the feed forward value for the next cycle to shift the movable portion which cannot be moved due to presence of the static frictional force otherwise.

As set forth above, by addition of the simple device, static friction of the sliding type actuator to be a cause of degradation of low order spindle rotation synchronization run-out can be reduced.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
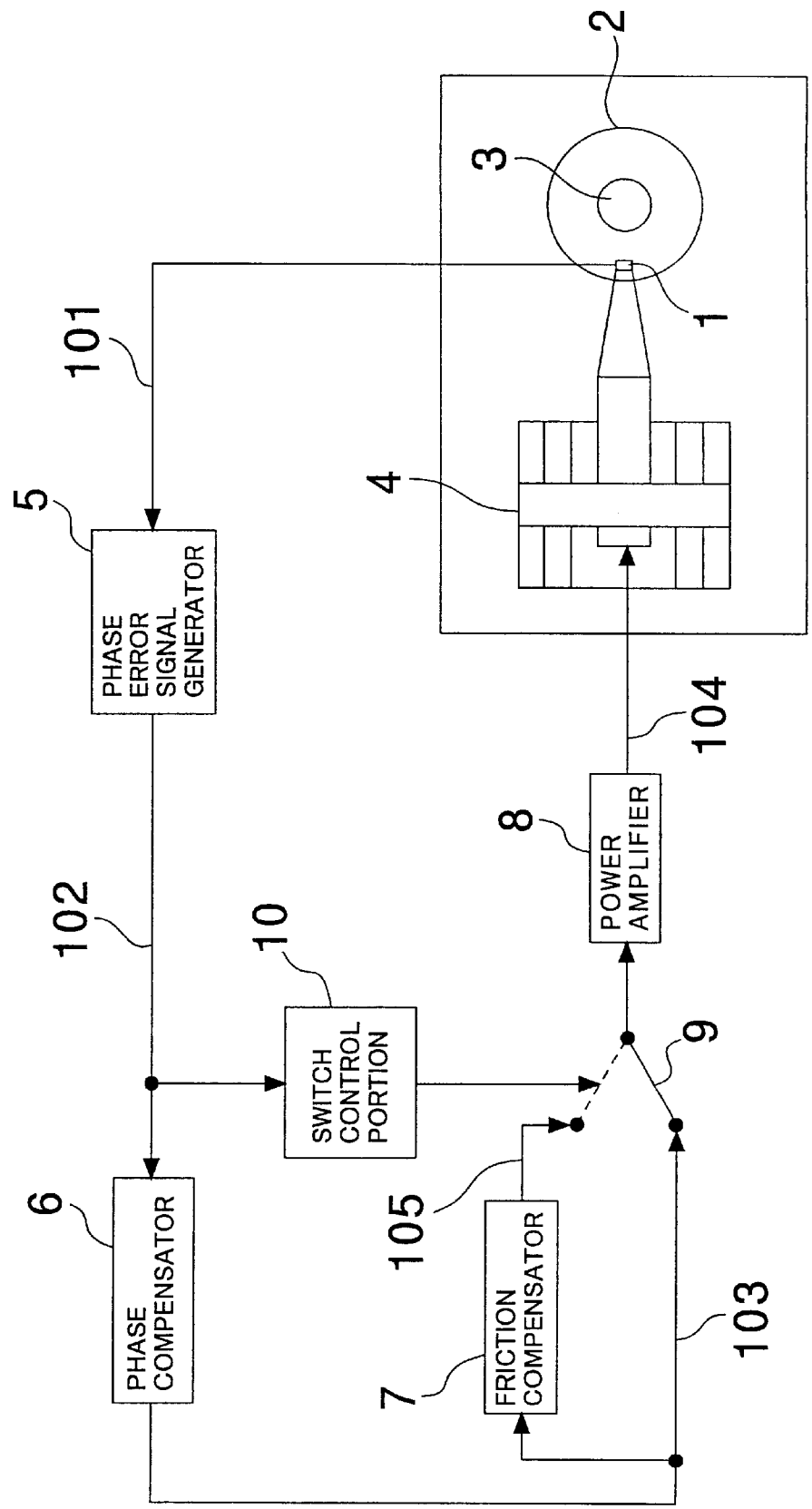
FIG. 1 is a block diagram showing a construction of one embodiment a disk drive according to the present invention.

FIG. 1 is a block diagram showing a construction of one embodiment of a disk drive according to the present invention. In FIG. 1, one embodiment of the present invention is constructed with a head 1, a disk medium 2, a spindle 3, an actuator 4, a position error signal generator 5, a position compensator 6, a friction compensator 7, a power amplifier 8, a switch 9 and a switch control portion 10.

The head 1 reads a servo signal written on a storage surface of the disk medium and outputs the servo signal 101 to the position error signal generator 5. The position error signal generator 5 is input to the servo signal 101 to output a position error signal 102 to the phase compensator 6.

When the phase compensator 6 is responsive to the position error signal to establish stability of a control system and outputs a control signal 103 for the actuator 4 to the power amplifier 8 via a switch 9. When the power amplifier 8 is responsive to the control signal 103 input via the switch 9 to feed a drive current signal 104 corresponding to the control signal 103 to the actuator 4. Thus, the head 1 is shifted by the actuator.

The friction compensator 7 monitors the control signal 103 of the actuator 4 to capture a timing where the control signal exceeds a preliminarily set threshold value. Also, the friction compensator 7 stores the control signal 103 at a peak.

The friction compensator 7 counts the servo signal from the timing where the control signal is increased across the threshold value and outputs the peak value of the stored control signal 103 at a timing where counting for one turn is completed, to the switch 9 as a feed forward signal 105. When the feed forward signal 105 is supplied to the actuator 4 via the switch 9 and the power amplifier 8 as the drive current signal 104, movement of a movable portion 12 of the actuator 4 is initiated.

The switch control portion 10 continues monitoring of the position error signal 102 from the position error signal generator 5 even after outputting of the peak value of the immediately preceding turn as the feed forward value to make judgment that the movable portion 12 has not moved when the position error is further increased or is held unchanged, to control the switch 9 to further apply the feed forward signal 105 to the power amplifier 8. Conversely, when the position error is abruptly increased in opposite direction, the switch control portion 10 controls the switch 9 to shorten a period to output the feed forward signal 105 in the immediately following turn.

Figure 2:
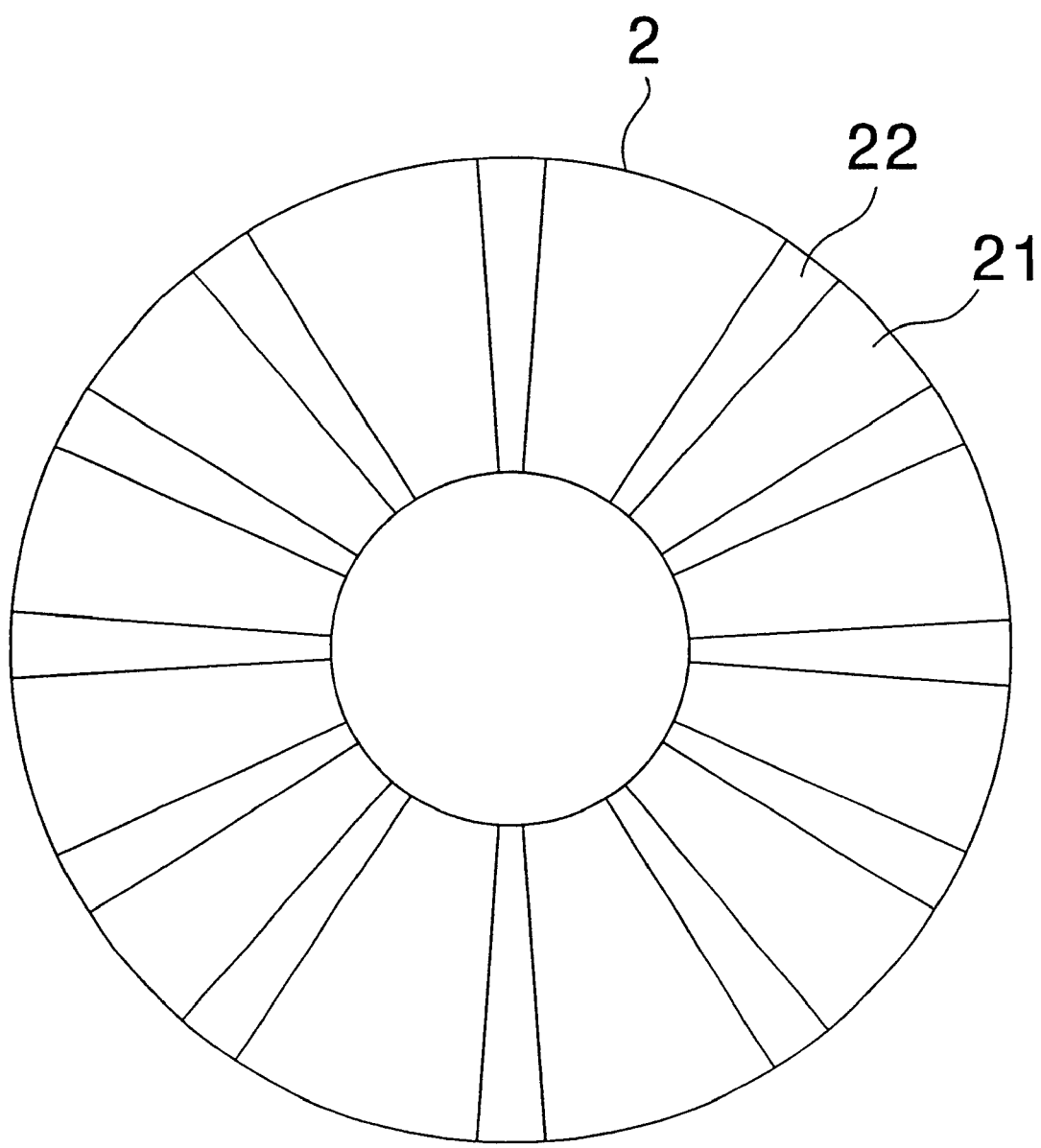
FIG. 2 is an illustration showing one example of a servo region of a disk medium of FIG. 1.

FIG. 2 is an illustration showing one example of a servo region of the disk medium 2 of FIG. 1. In FIG. 2, the disk medium is consisted of a data region 21 and a servo region 22. In the servo region, the servo signal is written.

Figure 3:
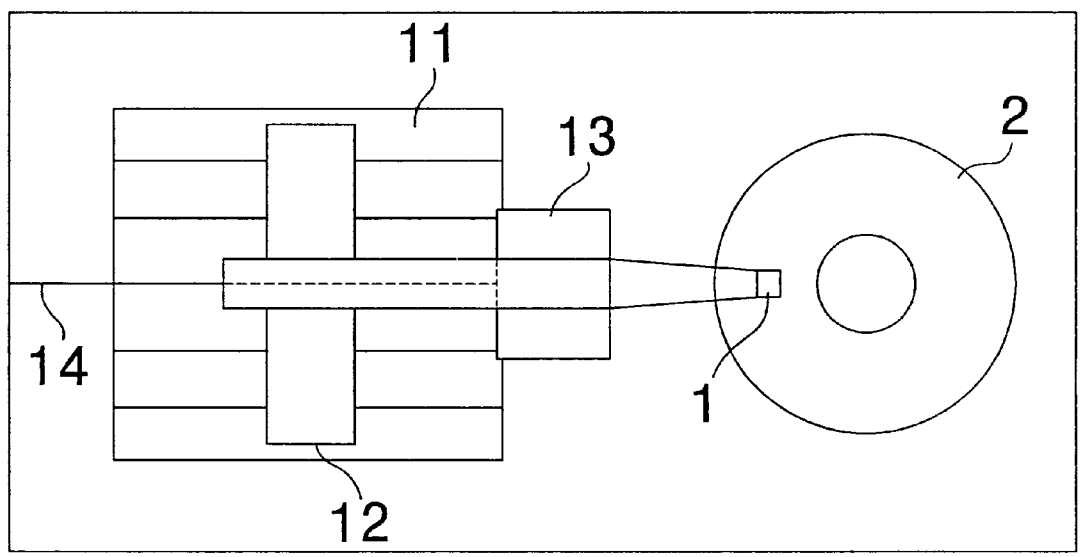
FIG. 3 is an illustration showing one example of a sliding type actuator forming an actuator of FIG. 1.
Figure 4:
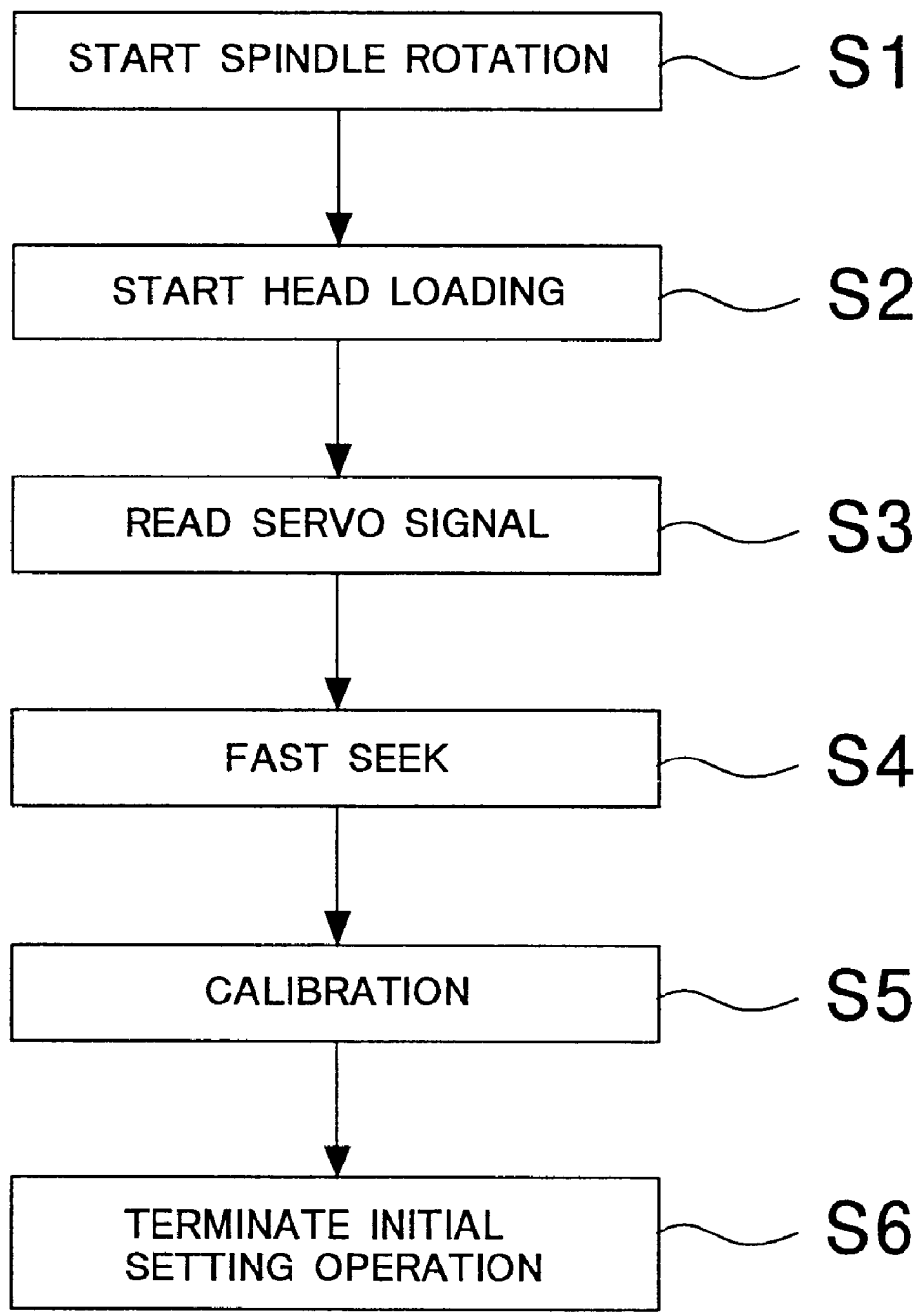
FIG. 4 is a flowchart showing a starting-up process of one embodiment of the disk drive according to the present invention.

FIG. 3 is an illustration showing one example of a sliding type actuator forming the actuator 4 of FIG. 4. In FIG. 3, the actuator 4 is constructed with a base portion 11, the movable portion 12, a center rod stop portion 13 and a center rod 14.

Operation of one embodiment of the disk drive according to the present invention will be discussed with reference to FIGS. 1 to 3.

On the disk medium 2, the servo signal is written in the servo region 22, as shown in FIG. 2. By reading out the servo signal 101 by means of the head 1, the position error signal 102 indicative of a relative position between the disk medium 2 and the head 1 can be obtained. In the shown embodiment, a sector servo system depending upon a burst signal generally employed in a magnetic disk drive as the position error signal 102, is employed. However, even in a round groove system typically employed in an optical disk drive, for example, the present invention may be applicable similarly to the magnetic disk drive by discretely utilizing the position error signal.

The disk medium 2 is rotated by the spindle 3 to read the servo signal 101 floating or contacting the head thereon. By shifting the head 1 with compensating the position error between the head 1 and the center of the track on the storage surface of the disk medium 2, positioning operation of the head 1 is performed to perform reading or writing of data.

There is two positioning mode of the disk drive, in which one is a seek mode shifting the head 1 to a target track, and a follow mode, in which the head 1 is shifted to follow the center of the track. It should be noted that since the operation to shift the head to follow the center of the track with superimposing an offset may have no difference in connection with the present invention, and is included in the follow mode. In this case, the center of the track is replaced with the position, in which the offset is superimposed to the center of the track.

As shown in FIG. 3, as the actuator 4, the sliding type actuator formed with the base portion 11 of the magnet and the movable portion 12 of the coil. The sliding type actuator shown in FIG. 3 shifts the actuator 4 with taking the center rod 14 as a guide. It is also possible to guide the lateral sides of the actuator by employing two rods. Also, other guiding methods may be employed for implementing the present invention.

Since the sliding type actuator slides with contacting the base portion 11 and the movable portion 12 in the guide portion, a friction is caused. This friction can be reduced by applying a lubricant oil to the rod 14. Particularly, a relative speed between the base portion 11 and the movable portion 12 temporary becomes zero during follow mode operation to follow the head 1 to the center of the track. At this type, the friction is changed from a dynamic frictional force to a static frictional force.

To overcome the static frictional force, a larger force is required to typically move the movable portion 12 in comparison with that required for overcoming the dynamic frictional force. This becomes a cause to degrade positioning characteristics of the head upon follow mode operation.

The center of the track is shifted while the movable portion 12 does not move, to increase the position error greater. When an actuation force of the actuator becomes greater than or equal to a given value, the movable portion 12 is moved. The given value becomes a sufficient force for shifting the movable portion 12 against the static frictional force.

Therefore, when the movable portion 12 is not shifted due to the static frictional force, this force is taken as the feed forward signal 105 and the signal generating this force is applied to the actuator 4 to shift the movable portion 12.

On the hand, as a method for detecting whether the movable portion becomes immobile or nor, a threshold value may be provided for the control signal 103 of the actuator or the drive current signal 104 as a signal converted into the current signal by the power amplifier 8 to detect exceeding of a given range. After substantially one turn, a signal indicative of the peal value of the control signal 104 for the actuator is output as the feed forward signal 105.

Here, the reason why the timing of reaching at substantially one turn, is that at the timing, the movable portion 12 is situated in static condition by static frictional force, and the movable portion 12 is preferably moved slightly before the timing where the threshold value is exceeded. However, in practice, after just one turn or several samples before reaching one turn, the feed forward signal is applied.

A value of the several samples is number of samples proportional to the preliminarily applied value or the peak value. On the other hand, the reason why the signal at the peak is taken, is that when the movable portion 12 initiates motion from condition held static by the static friction force, the head 1 is located close to the center of the track to male the control signal 103 for the actuator smaller. Therefore, the control signal 103 for actuator 4 becomes largest upon initiation of movement.

A period for applying the feed forward signal 105 may be one to several sampling period or a period shorter than one sampling period. In the alternative, the period may be a period added a period shorter than the one sampling period to one to several sampling periods.

On the other hand, it is possible to perform automatic adjustment with monitoring the control signal 103 for the actuator 4, the drive current signal or the position error signal 102, so that when the feed forward signal 105 is applied for one sampling period or a period shorter than one sampling period, if the position error is further increased or is maintained unchanged, judgment is made that the movable portion 12 is not moved to further add a period for applying the feed forward signal 105 to apply the feed forward signal for a longer period in the next cycle, and conversely, when the position error is increased in opposite direction, the feed forward signal is applied for a shorter period in the next cycle, or an output value of the feed forward signal is reduced to a smaller value.

Detection whether the movable portion 12 is moved or not can also be done by monitoring the position error signal 102 and by detecting the position error exceeding the threshold value. Even in this case, the control signal 103 for the actuator 4 at the peak of the position error may be used as the feed forward value of the control signal 103 for the actuator 4.

Upon transition to the seek mode for shifting the head 1 to another track, the static frictional force does not influence. Therefore, feed forward control is temporarily interrupted, The feed forward control is resumed after transition to the follow mode. At this time, when automatic adjustment is performed, the feed forward control may be performed using the value before seeking. However, it should be desirable to re-start from detection of static friction with once erasing the stored value.

FIG. 4 is a flowchart showing a starting up process of one embodiment of the disk drive according to the present invention. A practical operation of one embodiment of the disk drive according to the present invention will be discussed with reference to FIGS. 1 to 4.

At first, a procedure for starting up the disk drive will be discussed. Outline of the starting up procedure is as shown by the flowchart of FIG. 4. At first, the spindle 3 is driven to rotate (step S1 of FIG. 4).

Detecting stabilization of rotation speed, loading operation of the head 1, namely operation to shift the head 1 which has been retracted outside, above the storage surface of the disk medium 2 (step S2 of FIG. 4). It should be noted that, in order to speeding up starting up of the disk drive, the loading of the head 1 may be initiated upon detection of the rotation speed rising to be higher than a given speed.

After loading the head 1, reading operation of the servo signal written on the storage surface of the disk medium is started (step S3 of FIG. 4). Then, the head 1 is shifted to seek for a track, in which information necessary for data access such as data of file format information or the like (step S4 of FIG. 4). Then, calibration operation is performed (steps S5 and S6 of FIG. 4). In the calibration operation, output adjustment of the head, adjustment of parameter of the positioning controller and so forth are performed. There after, the head 1 is shifted to a track, in which a target data is written. Thereafter, the operation move is transit to the follow mode to make the head 1 to follow the target track.

FIG. 1 shows the embodiment in the follow mode. In the basic construction of the embodiment, the servo signal 101 written on the storage surface of the disk medium 2 from the head 1, is read to generate the position error signal 102 by the position error signal generator 5. The position error signal is fed to the phase compensator 6 to certainly stabilize the control system. Then, the control signal 103 for the actuator 4 is fed to the power amplifier 8.

The power amplifier 8 feeds the drive current signal 104 to the actuator for causing shifting of the head 1 by means of the actuator. At this time, the friction compensator 7 monitors the control signal 103 of the actuator 4 to capture a timing where the control signal exceeds the range defined by the preliminarily set threshold value, and stores the value of the control signal 103 at the peak.

The friction compensator 7 starts counting of the servo signal at the timing where the control signal 103 exceeds the threshold value. Upon completion of counting for one cycle or one turn of the disk, the friction compensator 7 outputs the stored peak value of the control signal 103 to initiate shifting of the movable portion 12. Even when the control signal having a value exceeding the threshold value occurs at a plurality of positions, the friction compensator 7 may perform the foregoing operation by correlating the count value of the servo signal with the peak value as a set.

The switch control portion monitors the position error signal 102 even after outputting the peak value of the preceding cycle as the feed forward value. Then, if the position error is further increased or is held unchanged, judgment is made that the movable portion 12 does not move to control the switch 9 to further apply the feed forward signal 105 to the power amplifier. Conversely, when the position error is abruptly increased in opposite direction, the switch 9 is controlled to shorten the period for outputting the feed forward signal 105 for the next cycle.

On the other hand, upon transition to the seek mode to shift the head 1 to another track, all of storage of the feed forward signal 105 is erased. Then, after reaching the target track and the operation mode is switched into the follow mode, process from detection of the static friction is performed again to execute the foregoing routine.

As set forth above, by addition of the simple device, static friction of the sliding type actuator to be a cause of degradation of low order spindle rotation synchronization run-out can be reduced.

As can be appreciated from the discussion given hereinabove, according to the present invention, static friction of the sliding type actuator to be a cause of degradation of low order spindle rotation synchronization run-out can be reduced by detecting the position error between the center of the data track on the disk medium and the head for reading out data from the disk medium, and outputting the feed forward signal for driving the shifting means for shifting the head when influence of the static friction for the shifting means for shifting the head is detected from the output of the phase compensator for positioning the head at the target position of the head on the basis of the result of detection.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A positioning control system for a disk drive comprising:

position error detecting means for detecting a position error between a center of a data track on a disk medium and a head for reading data from said disk medium;

shifting means for shifting said head;

a phase compensator for positioning said head at a target position on the basis of a result of detection of said position error detecting means;

detecting means for detecting influence of a static frictional force for said shifting means based on an output of said phase compensator;

a friction compensator outputting a feed forward signal for driving said shifting means; and means for applying said feed forward signal from said friction compensator to said shifting means from said friction compensator when influence of said static frictional force to said shifting means is detected by said detecting means.

2. A head positioning control system for a disk drive as set forth in claim 1, wherein said shifting means is a sliding type actuator.

3. A head positioning control system for a disk drive as set forth in claim 1, wherein said friction compensator detects influence of the static frictional force to said shifting means by monitoring at least one of a control signal for said shifting means output from said phase compensator or a driven current signal for driving said shifting means.

4. A head position control system for a disk drive as set forth in claim 1, wherein said feed forward signal is a signal for generating a sufficient force for shifting said head against influence of static frictional force on said shifting means.

5. A head position control system for a disk drive as set forth in claim 4, wherein said feed forward signal is a peak value of one of said control signal and said drive current signal.

6. A head position control system for a disk drive as set forth in claim 1, wherein said detecting means detects influence of said static frictional force on said shifting means by monitoring result of detection of said position error detecting means.

7. A head position control system for a disk drive as set forth in claim 1, wherein means for applying said feed forward signal to said shifting means is a switch for switching between an output of said phase compensator and said feed forward signal from said friction compensator.

* * * * *